United States Patent [19]

Neeff

[11] 3,792,970

[45] Feb. 19, 1974

[54] EXHAUSTION PROCESS FOR DYEING SYNTHETIC FIBRE MATERIALS

[75] Inventor: Rutger Neeff, Leverkusen, Germany

[73] Assignee: Bayer Aktiengesellschaft, Leverkusen, Germany

[22] Filed: Apr. 14, 1972

[21] Appl. No.: 244,235

[30] Foreign Application Priority Data

Apr. 14, 1971 Germany............................ 2118019

[52] U.S. Cl.................................. 8/39, 8/94, 8/174, 260/380
[51] Int. Cl........................... D06p 1/20, D06p 3/54
[58] Field of Search.... 8/39 R, 39 C, 39 B, 174, 94; 260/380, 376

[56] References Cited
UNITED STATES PATENTS

| | | | |
|---|---|---|---|
| 3,510,243 | 5/1970 | Seuret et al................................ | 8/39 |
| 3,549,667 | 12/1970 | Wunderlich et al. ................ | 260/380 |
| 2,274,751 | 3/1942 | Sowter et al............................ | 8/173 |
| 3,349,104 | 10/1967 | Lodge................................. | 260/376 |
| 3,636,065 | 1/1972 | Guye-Viulleme................. | 8/39 C X |

FOREIGN PATENTS OR APPLICATIONS 1,217,380   12/1970   Great Britain.......................... 8/174

*Primary Examiner*—Leon D. Rosdol
*Assistant Examiner*—T. J. Herbert, Jr.
*Attorney, Agent, or Firm*—Allan R. Plumley

[57] ABSTRACT

Exhaust process for the dyeing of synthetic fibre materials from organic water-immiscible solvents wherein are used as dyestuffs anthraquinone dyestuffs of the formula

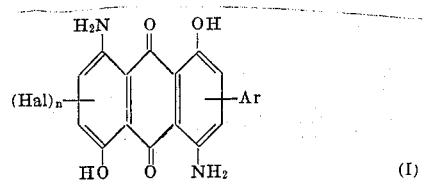

(I)

in which Ar, Hal and $n$ have the meaning given below in the disclosure. By means of these dyestuffs there are obtained dyeings in excellent dyestuff yields and fastness properties.

11 Claims, No Drawings

EXHAUSTION PROCESS FOR DYEING SYNTHETIC FIBRE MATERIALS

The invention relates to an exhaustion process for dyeing synthetic fibre materials from organic water-immiscible solvents; more particularly it concerns an exhaustion process for dyeing synthetic fibre materials from organic water-immiscible solvents wherein are used as dyestuffs anthraquinone dyestuffs of the formula

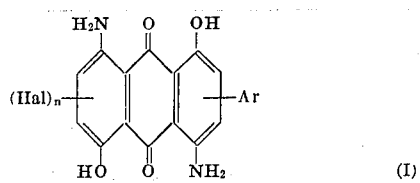

in which
Ar denotes a mononuclear or binuclear aryl radical which is substituted by 2 or 3 hydroxyl groups and optionally by lower alkyl or cycloalkyl groups and is bonded to the anthraquinone radical via an aryl carbon atom,
Hal represents chlorine or bromine and
$n$ denotes a value of 0 to 2, preferably 0, are used for dyeing.

Mononuclear aryl radicals substituted by 2 or 3 hydroxyl groups which should especially be mentioned are dihydroxyphenyl and trihydroxyphenyl radicals, and dihydroxyphenyl and trihydroxyphenyl radicals substituted by lower alkyl groups, such as methyl, ethyl, propyl or butyl groups, and by cycloalkyl groups, such as cyclohexyl groups.

Polynuclear aryl radicals substituted by 2 or 3 hydroxyl groups which should above all be mentioned are dihydroxynaphthalene and trihydroxynaphthalene, dihydroxydiphenyl and trihydroxydiphenyl, dihydroxydiphenylmethane and trihydroxydiphenylmethane, dihydroxy-1,1-diphenylethane and trihydroxy-1,1-diphenylethane, and dihydroxy-2,2-diphenylpropane and trihydroxy-2,2-diphenylpropane radicals.

The anthraquinone dyestuffs of the formula (I) to be used according to the invention, wherein the hydroxyaryl group is in the 3-position and $n$ is 0, are obtained, for example, if a) a dihydroxyaryl or trihydroxyaryl compound is added to the boric acid ester of 1,5-dihydroxy-4,8-diamino-anthraquinone-2,6-disulphonic acid dissolved in concentrated sulphuric acid (see German Pat. specification No. 445,269), b) the addition product is warmed to 90° – 95° C in acid aqueous solution or to 20° – 60° C in alkaline solution, in the course of which a sulphonic acid group is split off (see German Pat. specification No. 446,563) and c) the sulphonic acid group still present in the reaction product is removed by reduction (see German Pat. specification No. 456,235).

The anthraquinone dyestuffs of the formula (I) to be used according to the invention, in which the hydroxyaryl group is in the 2-position and $n$ is 0, can be manufactured, for example, if following the instructions of British Pat. specification No. 1,024,036 1,5-dihydroxy-4,8-dinitro-anthraquinone in boric acid/sulphuric acid is reacted with a dihydroxyaryl or trihydroxyaryl compound, the boric acid ester groupings in the resulting products are saponified and the nitro groups are subsequently reduced, or if according to German Pat. specification No. 1,228,734 a dihydroxyaryl or trihydroxyaryl compound is added onto the quinone-imine obtainable from 1,5-dihydroxy-4,8-diamino-anthraquinone.

The dyestuffs substituted by chlorine or bromine atoms can for example be manufactured in accordance with the instructions of British Pat. specification No. 1,056,954 halogenating the halogen-free dyestuffs in organic solvents, such as nitrobenzene or o-dichlorobenzene, by means of bromine or sulphuryl chloride, or in sulphuric acid by means of bromine.

In the halogenated dyestuffs to be used according to the invention, $n$ is 0.1 to 2, preferably 0.3 to 2.

Possible organic water-immiscible solvents for the process according to the invention are those of boiling point between 40° and 170° C, for example aromatic hydrocarbons, such as toluene or xylene, and halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1-chlorobutane, 2-chlorobutane, 1,4-dichlorobutane, 1-chloro-2-methylpropane or 2-chloro-2-methylpropane, as well as aliphatic fluorinated hydrocarbons and fluoro-chlorinated hydrocarbons, such as perfluoro-n-hexane, 1,2,2-trifluorotrichloroethane and trifluoropentachloropropane and aromatic chlorinated and fluorinated hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly suitable. Mixtures of these solvents can also be used.

The dyeing liquors can contain small amounts, that is to say up to 1 per cent by weight, preferably up to 0.5 per cent by weight, of water, relative to the weight of the organic solvent.

In some cases it has also proved expedient to add non-ionic and/or ionic auxiliaries to the dyebaths. Suitable non-ionic auxiliaries are primarily the known interface-active ethoxylation and propoxylation products of fatty alcohols, alkylphenols, fatty acid amides and fatty acids as well as mixtures thereof; examples for ionic auxiliaries are anionic agents such as paraffin sulphonates or fatty alcohol sulphates; cationic agents such as N,N-dialkyl-N-($\alpha$-fatty acidacylamino-alkyl)-aminoxides or N-alkyl-N,N-bis-($\alpha$-fatty acidacylamino-alkyl)-aminoxides; or amphoteric agents such as surface active betaines or sulpho betaines.

The auxiliaries are used in an amount of 0.05 – 2 per cent by weight, referred to the weight of the organic solvents. Instead of being directly added to the dyebaths, the auxiliaries may also advantageously be used for pasting the dis- and tris-azo dyestuffs containing at least 2 hydroxyl groups, and in this way be added to the dyebaths in the form of a dyestuff auxiliary paste.

The synthetic fibre materials to be dyed according to the invention are above all fibre materials of polyesters, such as polyethylene terephthalate, poly-cyclohexane-dimethylene terephthalate, heterogeneous polyesters of terephthalic acid, sulphoisophthalic acid and ethylene glycol, or copolyether-ester fibers of p-hydroxybenzoic acid and ethylene glycol, cellulose triacetate, cellulose 2½-acetate or polycarbonates, for example from 2,2-bis-(hydroxyphenyl)-propane; polyacrylonitrile, and also fibre materials of synthetic polyamides, such as hexamethylenediamine adipate, poly-ε-caprolactam or ω-aminoundecanoic acid, as well as polyurethanes.

The fibre materials can be in the most diverse stages of processing, for example in the form of filaments, flocks, tops, piece goods, such as woven fabrics or knitted fabrics, or made-up goods.

The dyeing according to the invention is preferably carried out in closed apparatuses, for example by introducing the fibre materials, in a liquor ratio of 1:3 to 1:30, into the dyestuff dispersion at room temperature, heating the dyebath to 60° – 170° C and keeping it at this temperature until the liquor is exhausted. This is generally the case after 5 to 60 minutes. After cooling to room temperature, the liquor is separated off and, if necessary after brief rinsing with fresh organic solvent, the fibre materials are freed of adhering solvent by suction filtration or centrifuging and subsequent drying in a warm stream of air. Using the process according to the invention it is possible in a simple manner to dye synthetic fibre materials from organic solvents so as to achieve high dyestuff yields and excellent fastness properties.

The dyestuffs are used in an amount of 0.01 to 3 per cent by weight relative to the weight of the fibre materials.

The anthraquinone dyestuffs to be used according to the invention are sparingly soluble in the organic water-immiscible solvents. They are superior to the solvent-soluble dyestuffs used for dyeing synthetic fibre materials from organic solvents in having substantially better affinity and increased fastness to sublimation.

The dyestuffs to be used according to the invention are superior to the dyestuffs proposed in Deutsche Offenlegungsschriften (German Published Specifications) Nos. 1,932,828 and 1,939,095 for the exhaustion process for dyeing synthetic fibre materials from organic water-immiscible solvents, the latter dyestuffs being largely insoluble in these solvents, in that the present dyestuffs show considerably better affinity both in the presence of small amounts of water and, in particular, in completely dry solvents and give more rub-resistant dyeings.

It should be pointed out that mixtures of the dyestuffs to be used according to the invention at times give a better colour yield than do the individual dyestuffs.

The parts mentioned in the examples which follow are parts by weight.

EXAMPLE 1

100 parts of a woven fabric of texturised polyethylene terephthalate fibres are introduced at room temperature, without prior cleaning, into a dyebath which is prepared from one part of 1,5-dihydroxy-4,8-diamino-3-(3,4-dihydroxyphenyl)-anthraquinone in 1,600 parts of tetrachloroethylene. The bath is heated to 115° – 120° C over the course of 10 minutes whilst vigorously circulating the liquor and is kept at this temperature for 30 minutes. The liquor is then separated off and the goods being dyed are rinsed with fresh solvent for 5 minutes at about 40° C. After separating off the rinsing liquor, the goods being dyed are centrifuged and dried in a stream of air. A strong clear blue dyeing is obtained which is distinguished by good fastness to washing and to light and by its high dyeing yield, very good fastness to sublimation and very good fastness to rubbing.

An equivalent blue dyeing was obtained in the same manner on a fabric of polycyclohexanedimethylene terephthalate fibres.

The dyestuff used in Example 1 had been manufactured as follows:

20 parts of 1,5-dihydroxy-4,8-diamino-anthraquinone-2,6-disulphonic acid and 10 parts of boric acid were dissolved in 400 parts of concentrated sulphuric acid and warmed until the boric acid ester was formed, and 11 parts of 1,2-dihydroxy-benzene were then added over the course of 15 minutes at 0° – 5° C. The mixture was stirred for a further 15 minutes at 0° – 5° C, poured out onto 2,000 parts of ice water and warmed for 3 hours to 90° – 95° C. The 1,5-dihydroxy-4,8-diamino-3-(3,4-dihydroxyphenyl)-anthraquinone-2-sulphonic acid which precipitated was filtered off after the mixture had cooled, washed with water and dried. 20 parts of the dyestuff-acid obtained were stirred with 120 parts of concentrated ammonia and then diluted with 800 parts of water. The reaction mixture was treated with 10 parts of 86 percent strength sodium dithionite at 20° C under nitrogen, and the mixture was warmed to 90° C over the course of 1 hour and kept at 90° C for about 2 hours. After cooling, the dyestuff which had crystallised in blue prisms was filtered off, washed with water and dried.

EXAMPLE 2

100 parts of fibre yarn of poly-ε-caprolactam are introduced at room temperature into a dyebath containing one part of the dyestuff mentioned in Example 1, in 1,600 parts of tetrachloroethylene. The bath is warmed to 100° C over the course of 20 minutes whilst vigorously circulating the liquor and is kept at this temperature for 40 minutes. After this time, the liquor is separated off, the yarn is briefly rinsed with fresh solvent and after centrifuging the dyed material is dried in a stream of air.

A clear blue dyeing of good fastness properties, and showing a very high dyeing yield, is obtained.

An equivalent dyeing was also obtained on yarns of polyhexamethylenediamine adipate fibres.

EXAMPLE 3

100 parts of a fabric of polyethylene terephthalate fibres, in a dyebath containing 1 part of 1,5-dihydroxy-4,8-diamino-3-(2,4,6-trihydroxy-phenyl)-anthraquinone in 1,600 parts of tetrachloroethylene, are warmed to 120° – 125° C over the course of 10 minutes and dyed at this temperature for 30 minutes. After separating off the liquor, rinsing with fresh solvent at about 40° C and drying, a clear blue dyeing, which is distinguished by very good fastness to light, sublimation and washing and especially very good rub resistance, is obtained in a very high dyeing yield.

If the 1,600 parts of tetrachloroethylene are replaced by an equal amount of 1,1,2-trichloroethane, 1,1,1,2-tetrachloroethane, 1,1,2,2-tetrachloroethane, pentachloroethane, 1,2-dichloropropane, 2-chlorobutane, 1,4-dichlorobutane, perfluoro-n-hexane, 1,2,2-trifluoro-trichloroethane, trifluoropentachloropropane, chlorobenzene, fluorobenzene, chlorotoluene or benzotrifluoride, equivalent blue dyeings are obtained.

EXAMPLE 4

100 parts of a fabric of triacetate fibres are introduced, at room temperature, into a dyebath prepared from one part of the dyestuff mentioned in Example 1, in 1,600 parts of tetrachloroethylene. The bath is heated to 110° C over the course of 20 minutes whilst vigorously circulating the liquor and is kept at this temperature for 45 minutes. The liquor is then separated off and the fabric is rinsed with fresh tetrachloroethylene at 40° C. After separating off the rinsing liquor, the dyed material is freed of adhering solvent by centrifuging and drying in a stream of air. A full, clear blue dyeing with excellent fastness properties is obtained.

EXAMPLE 5

100 parts of yarn of cellulose 2½-acetate filaments are introduced, at 22° C, into a dyebath prepared from one part of the dyestuff mentioned in Example 1, 1,600 parts of tetrachloroethylene, 1.5 parts of oleic acid ethanolamide, 1.5 parts of oleyl alcohol-eicosaethylene glycol ether and six parts of water. The bath is warmed to 78° C over the course of 20 minutes and is kept at this temperature for 45 minutes. After separating off the dyeing liquor and rinsing with fresh tetrachloroethylene, the dyed material is freed of adhering solvent by suction and drying in a stream of air. A clear blue dyeing is obtained.

Strong blue dyeings were obtained, with very high dyeing yields, on polyester, polyamide, triacetate or 2½-acetate fibre materials if, instead of the dyestuff described, the same amount of one of the dyestuffs indicated in the table below was used. These dyestuffs were compounds of the formula (I) in which the hydroxyaryl radical Ar is in the 3-position and $n$ is 0. For simplicity, the dyestuffs in the table are merely characterised by the hydrocarbon Ar - H on which the radical Ar is based.

| Example | Ar — H |
|---|---|
| 6 | 1,3-Dihydroxy-benzene |
| 7 | 1,4-Dihydroxy-benzene |
| 8 | 1,2,3-Trihydroxy-benzene |
| 9 | 1,2-Dihydroxy-3-methyl-benzene |
| 10 | 1,2-Dihydroxy-4-methyl-benzene |
| 11 | 1,3-Dihydroxy-4-methyl-benzene |
| 12 | 1,3-Dihydroxy-5-methyl-benzene |
| 13 | 1,4-Dihydroxy-2-methyl-benzene |
| 14 | 1,3,5-Trihydroxy-2-methyl-benzene |
| 15 | 1,2,3-Trihydroxy-5-methyl-benzene |
| 16 | 1,2-Dihydroxy-4-cyclohexyl-benzene |
| 17 | 1,3-Dihydroxy-naphthalene |
| 18 | 1,5-Dihydroxy-naphthalene |
| 19 | 1,6-Dihydroxy-naphthalene |
| 20 | 1,7-Dihydroxy-naphthalene |
| 21 | 2,6-Dihydroxy-naphthalene |
| 22 | 2,3-Dihydroxy-naphthalene |
| 23 | 2,7-Dihydroxy-naphthalene |
| 24 | 1,3,6-Trihydroxy-naphthalene |
| 25 | 1,4,5-Trihydroxy-naphthalene |
| 26 | 2'-Chloro-2,5-dihydroxy-diphenyl |
| 27 | 2,2'-Dihydroxy-diphenyl |
| 28 | 4,4'-Dihydroxy-diphenyl |
| 29 | 4,4'-Dihydroxy-diphenylmethane |
| 30 | 1,1-bis-(4-Hydroxyphenyl)-ethane |
| 31 | 2,2-bis-(4-Hydroxyphenyl)-propane |
| 32 | 1,2-Dihydroxy-4-tert.-butyl-benzene |

EXAMPLE 33

100 parts of polyethylene terephthalate filaments are heated for 30 minutes to 120° – 125° C in a dyebath of one part of 1,5-dihydroxy-4,8-diamino-3-(3,4,5-trihydroxy-phenyl)-x-bromo-anthraquinone, containing 19.5 percent of bromine, three parts of oleic acid ethanolamide, three parts of oleyl alcohol-eicosaethylene glycol ether, 12 parts of water and 1,600 parts of tetrachloroethylene, whilst vigorously circulating the liquor, and are centrifuged and rinsed for 5 minutes with tetrachloroethylene at 40° C. A blue dyeing of very good fastness to sublimation, washing and light, and very good rub resistance, is obtained with a high dyeing yield.

If the tetrachloroethylene is replaced by an equal amount of 1,1,2-trichloroethane, an equivalent dyeing is obtained.

Similar dyeings are also obtained if instead of polyethylene terephthalate filaments fibres of anionically modified polyethylene terephthalate (Dacron 64) or of anionically modified polyhexamethylenediamine adipate (Nylon T 844) are used.

Similar dyeings are obtained if instead of the indicated dyestuff, containing 19.5 percent of bromine, corresponding dyestuffs containing 10, 15 or 22.5 percent of bromine are used.

The dyestuff mentioned in Example 33 had been manufactured as follows:

10 parts of 1,5-dihydroxy-4,8-diamino-3-(3,4,5-trihydroxy-phenyl)-anthraquinone in 200 parts of nitrobenzene are treated with 10 parts of bromine at 50° C and the mixture is stirred until a bromine content of 19.5 percent is reached. The nitrobenzene is stripped off in steam and 12 parts of dyestuff are obtained.

EXAMPLE 34

100 parts of polyacrylonitrile fibre yarn are warmed to 100° C in a dyebath of one part of 1,5-dihydroxy-4,8-diamino-2-(2,4-dihydroxy-phenyl)-x-chloro-anthraquinone, containing about 10 percent of chlorine, in 1,600 parts of tetrachloroethylene, over the course of 20 minutes, and are dyed for 30 minutes at this temperature. After the usual washing and drying, a blue dyeing of good fastness properties is obtained.

The dyestuff can be obtained in a known manner if 10 parts of 1,5-dihydroxy-4,8-diamino-3-(2,4-dihydroxy-phenyl)-anthraquinone in 200 parts of o-dichlorobenzene are chlorinated with 10 parts of sulphuryl chloride at 60° C until a chlorine content of about 10 percent is reached.

EXAMPLE 35

100 parts of polyethylene terephthalate fabric are dyed for 30 minutes at 120° – 125° C in a dyebath of one part of 1,5-dihydroxy-4,8-diamino-2-(3,4-dihydroxy-phenyl)-anthra-quinone, 3 parts of oleic acid ethanolamide, 3 parts of oleyl alcohol-eicosaethylene glycol ether, 12 parts of water and 1,600 parts of tetrachloroethylene. After rinsing with fresh tetrachloroethylene and drying, a strong greenish-tinged blue dyeing, having very good rub resistance and very good fastness to sublimation, washing and light, is obtained in a very high dyeing yield.

The dyestuff used had been manufactured as follows:

16.5 parts of 1,5-dihydroxy-4,8-dinitro-anthraquinone were dissolved in 370 parts of concentrated sulphuric acid and 25 parts of boric acid, mixed with 11 g of 1,2-dihydroxy-benzene at −15° C and stirred for 1.5 hours at −15° C. Thereafter the mixture was poured out onto 2,000 parts of ice water and the suspension was boiled for 30 minutes. After filtering and washing until neutral, the moist residue, in 500 parts of water and 200 parts of ethanol, was heated with 80 parts of 18 percent strength sodium hydrogen sulphide solution to 90° – 95° C for 1 hour and neutralised with sodium hydrogen sulphite solution. Thereafter the product was filtered off and washed with hot water, and the filter residue was boiled up with dilute hydrochloric acid. After filtering, washing with water and drying, 1,5-dihydroxy-4,8-diamino-2-(3,4-dihydroxyphenyl)-anthraquinone was obtained in very good yield.

Strong greenish-tinged blue dyeings were also obtained in very high dyeing yields on polyester, polyamide, triacetate or 2½-acetate fibres if instead of the indicated dyestuff the same amount of one of the dyestuffs indicated in the table below was used. These dyestuffs are compounds of the formula (I) in which the hydroxyaryl radical Ar is in the 2-position and $n$ is 0. For simplicity, the dyestuffs are merely characterised in the table by the hydrocarbon Ar – H on which the radical Ar is based.

| Example | Ar — H |
| --- | --- |
| 36 | 1,3-Dihydroxy-benzene |
| 37 | 1,4-Dihydroxy-benzene |
| 38 | 1,2,3-Trihydroxy-benzene |
| 39 | 1,3,5-Trihydroxy-benzene |
| 40 | 1,2-Dihydroxy-2-methyl-benzene |
| 41 | 1,2-Dihydroxy-4-methyl-benzene |
| 42 | 1,3-Dihydroxy-4-methyl-benzene |
| 43 | 1,3-Dihydroxy-5-methyl-benzene |
| 44 | 1,4-Dihydroxy-4-methyl-benzene |
| 45 | 1,3,5-Trihydroxy-2-methyl-benzene |
| 46 | 1,2,3-Trihydroxy-5-methyl-benzene |
| 47 | 1,2-Dihydroxy-4-cyclohexyl-benzene |
| 48 | 1,3-Dihydroxy-naphthalene |
| 49 | 1,5-Dihydroxy-naphthalene |
| 50 | 1,6-Dihydroxy-naphthalene |
| 51 | 1,7-Dihydroxy-naphthalene |
| 52 | 2,6-Dihydroxy-naphthalene |
| 53 | 2,3-Dihydroxy-naphthalene |
| 54 | 2,7-Dihydroxy-naphthalene |
| 55 | 1,3,6-Trihydroxy-naphthalene |
| 56 | 1,4,5-Trihydroxy-naphthalene |
| 57 | 2'-Chloro-2,5-dihydroxy-diphenyl |
| 58 | 2,2'-Dihydroxy-diphenyl |
| 59 | 4,4'-Dihydroxy-diphenyl |
| 60 | 4,4'-Dihydroxy-diphenylmethane |
| 61 | 1,1-bis-(4-Hydroxyphenyl)-ethane |
| 62 | 2,2-bis-(4-Hydroxyphenyl)-propane |
| 63 | 1,2-Dihydroxy-4-tert.-butyl-benzene |

EXAMPLE 64

50 parts of a fabric of polyester fibres are introduced, at room temperature, into a dyebath which is prepared from 0.5 part of the dyestuff mentioned in Example 1, 0.5 part of the dyestuff mentioned in Example 35, 1.5 parts of oleic acid ethanolamide, 1.5 parts of oleyl alcohol-eicosa-ethylene glycol ether, six parts of water and 800 parts of tetrachloroethylene. The bath is heated to 120° C over the course of 10 minutes whilst vigorously circulating the liquor and is kept at this temperature for 45 minutes. After separating off the dyeing liquor, the dyed material is rinsed with fresh solvent at 40° C and after removal of the rinsing liquor is dried in a stream of air. A deep blue dyeing of excellent fastness to light and to sublimation and very good rub resistance is obtained in a very good dyeing yield.

EXAMPLE 65

100 parts of a knitted fabric of polyethylene terephthalate fibres are dyed for 30 minutes at 115° C in a dyebath which contains one part of 1,5-dihydroxy-4,8-diamino-3-(3,4-dihydroxyphenyl)-x-bromo-anthraquinone, containing 19 percent of bromine, and 2,000 parts of tetrachloroethylene. After the customary rinsing and drying, a greenish-tinged blue dyeing of very good fastness to sublimation, washing and light and very good rub resistance is obtained in a very good dyeing yield.

The dyestuff used was manufactured by bromination of 1,5-dihydroxy-4,8-diamino-2-(3,4-dihydroxyphenyl)-anthraquinone in accordance with the instructions of Example 33.

A similarly greenish-tinged blue dyeing is obtained if instead of the dyestuff mentioned in Example 65 one part of 1,5-dihydroxy-4,8-diamino-2-(2,4-dihydroxyphenyl)-x-chloroanthraquinone, containing about 12 percent of chlorine, was used.

We claim:

1. Process for dyeing synthetic fiber materials by exhaustion comprising the steps of (A) introducing the synthetic fiber materials into a dyebath consisting essentially of organic solvent, up to 1 percent by weight of water based on said organic solvent and anthraquinone dyestuff; said organic solvent consisting of water-immiscible organic solvent boiling between 40° and 170° C; said anthraquinone dyestuff having the formula

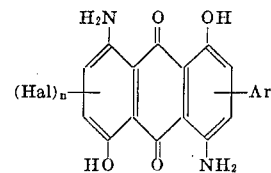

in which Ar is a mononuclear or binuclear aryl radical which is substituted by two or three hydroxyl groups or a mononuclear or binuclear aryl radical substituted by two or three hydroxy groups and lower alkyl or cycloalkyl; wherein Ar is bonded to the anthraquinone radical via an aryl carbon atom;

Hal is chlorine or bromine; and $n$ is 0, 1 or 2;

and (B) dyeing at a temperature of 60° to 170° C until the dyestuff is exhausted from the dyebath.

2. The process of claim 1 in which $n$ is 0.

3. The process of claim 1 in which Ar is in the 2-position relative to the anthraquinonyl hydroxyl group.

4. The process of claim 1 in which Ar is in the 3-position relative to the anthraquinonyl hydroxyl group.

5. The process of claim 1 in which Ar is a radical of benzene, naphthalene, diphenyl, diphenylmethane, 1,1-diphenylethane or 2,2-diphenylpropane which is substituted by two or three hydroxyl groups or a radical of benzene, naphthalene, diphenyl, diphenylmethane, 1,1-diphenylethane or 2,2-diphenylpropane which is substituted by two or three hydroxyl groups and $C_1$-$C_4$-alkyl or cycloalkyl groups.

6. The process of claim 1 in which said water-immiscible organic solvent is an aliphatic halogenated hydrocarbon boiling in the range of 40° to 170° C.

7. The process of claim 1 in which said water-immiscible organic solvent is tetrachloroethylene, trichloroethylene or 1,1,1-trichloroethane.

8. The process of claim 1 in which said water-immiscible organic solvent contains up to 1 per cent by weight of water referred to the weight of the organic solvent.

9. The process of claim 1 in which said water-immiscible organic solvent contains up to 0.5 per cent by weight of water referred to the weight of the organic solvent.

10. The process of claim 1 in which said water-immiscible organic solvent contains 0.05 to 2 per cent by weight of a nonionic dyeing auxiliary referred to the weight of the organic solvent.

11. The process of claim 1 in which said water-immiscible organic solvent contains 0.05 to 2 per cent by weight of an ionic dyeing auxiliary referred to the weight of the organic solvent.

* * * * *